US012755058B2

(12) United States Patent
Hamada

(10) Patent No.: US 12,755,058 B2
(45) Date of Patent: Oct. 6, 2026

(54) SECRET MULTIPLE REPETITION CALCULATION APPARATUS, METHOD AND PROGRAM

(71) Applicant: NTT, Inc., Tokyo (JP)

(72) Inventor: Koki Hamada, Tokyo (JP)

(73) Assignee: NTT, Inc., Tokyo (JP)

( * ) Notice: Subject to any disclaimer, the term of this patent is extended or adjusted under 35 U.S.C. 154(b) by 1226 days.

(21) Appl. No.: 17/764,977

(22) PCT Filed: Oct. 10, 2019

(86) PCT No.: PCT/JP2019/040006

§ 371 (c)(1),
(2) Date: Mar. 30, 2022

(87) PCT Pub. No.: WO2021/070322

PCT Pub. Date: Apr. 15, 2021

(65) Prior Publication Data

US 2022/0350638 A1 Nov. 3, 2022

(51) Int. Cl.
*G06F 21/72* (2013.01)
*G06F 21/14* (2013.01)

(52) U.S. Cl.
CPC .............. *G06F 21/72* (2013.01); *G06F 21/14* (2013.01)

(58) Field of Classification Search
CPC .......... G06F 17/10; G06F 21/14; G06F 21/72; H04L 2209/08; H04L 2209/46
See application file for complete search history.

(56) References Cited

U.S. PATENT DOCUMENTS

2014/0129604 A1 * 5/2014 Clavier .................... H04L 9/302 708/606
2020/0112425 A1 * 4/2020 Dubeuf ................. H04L 9/0861

OTHER PUBLICATIONS

David Molnar et al., "The Program Counter Security Model: Automatic Detection and Removal of Control-Flow Side Channel Attacks", IACR, International Association for Cryptologic Research, vol. 1, Dec. 13, 2005, downloaded by EPO on May 31, 2011, total 25 pages.
Meng Wu et al., "Eliminating Timing Side-Channel Leaks using Program Repair", Software Testing and Analysis, ACM, Jul. 12, 2018, pp. 15-26, total 12 pages.
Chida et al., "A Three-Party Secure Function Evaluation with Lightweight Verifiability Revisited", CSS, 2010, 13 pages including English Translation.

* cited by examiner

*Primary Examiner* — Carlo Waje
(74) *Attorney, Agent, or Firm* — XSENSUS LLP

(57) ABSTRACT

When an inside iterative calculation does not end after a predetermined number of iterations, a midway value of a loop variable is retained and a calculation of an output value is not performed in an outside iterative calculation. In addition, subsequently, execution of the iterative calculation is continued using the value of the loop variable having been retained when the inside iterative calculation is executed once again. In other words, in each iterative calculation, an object iterative calculation is only performed when all iterative calculations immediately inside the object iterative calculation have ended.

3 Claims, 8 Drawing Sheets

EXAMPLE OF PROCESSING OF SECURE ITERATIVE COMPUTATION UNIT 2 WITH RESPECT TO FIRST ITERATIVE CALCULATION

```
Notation: f1([x1], [y1])
Input: [x1], [y1]
Output: [z1]
(SECRET INPUT REFLECTION UNIT 21(step 21))
if AND(EQ([s1], PRE), NE([x1], NULL), NE([y1], NULL)) then
  (step a)
  [a1]←[x1]
  [b1]←[a1]
  [t1]←LE([y1], [b1])
  (step b)
  [s2]←PRE
   (step c)
   [s1]←RUN
end if
(SECRET UPDATE UNIT 22(step 22))
for i1=1 to n1 do
   (step 221)
   [a'1]←D-Add([a1], 1)
   [b'1]←D-Add([b1], f2([a'1]))
   [t'1]←D-LE([y1], [b'1])
   (step 222)
   if AND(EQ([s1], RUN), EQ([s2], END)) then
      (step b-i)
      [a1]←[a'1]
      [b1]←[b'1]
      [t1]←[t'1]
      (step b-ii)
      [s2]←PRE
   end if
   (step 223)
   if AND(EQ([s1], RUN), EQ([t1], 1)) then
      [s1]←END
   end if
end for
(SECRET OUTPUT CALCULATION UNIT 23(step 23))
[z'1]←[b1]
if EQ([s1], END) then
   [z1]←[z'1]
else
   [z1]←NULL
end if
return[z1]
```

Fig. 3

EXAMPLE OF PROCESSING OF SECRET INITIALIZATION UNIT 1

1. $[s_1] \leftarrow$ PRE
2. $[a_1] \leftarrow$ NULL
3. $[b_1] \leftarrow$ NULL
4. $[t_1] \leftarrow$ NULL
5. $[s_2] \leftarrow$ PRE
6. $[a_2] \leftarrow$ NULL
7. $[t_2] \leftarrow$ NULL

Fig. 4

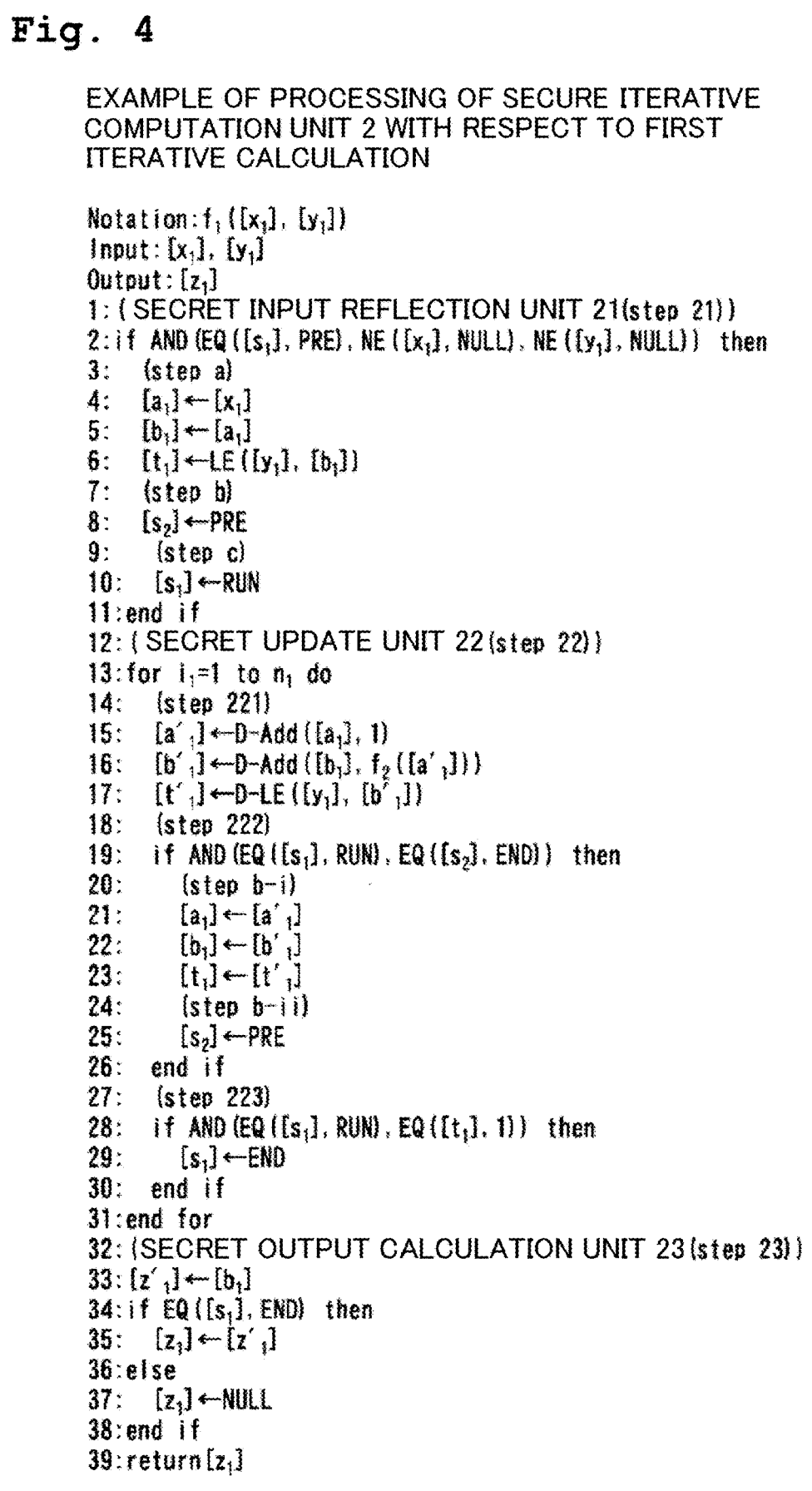

EXAMPLE OF PROCESSING OF SECURE ITERATIVE COMPUTATION UNIT 2 WITH RESPECT TO FIRST ITERATIVE CALCULATION

```
Notation:f_1([x_1], [y_1])
Input:[x_1], [y_1]
Output:[z_1]
(SECRET INPUT REFLECTION UNIT 21(step 21))
if AND(EQ([s_1], PRE), NE([x_1], NULL), NE([y_1], NULL)) then
  (step a)
  [a_1]←[x_1]
  [b_1]←[a_1]
  [t_1]←LE([y_1], [b_1])
  (step b)
  [s_2]←PRE
   (step c)
   [s_1]←RUN
end if
(SECRET UPDATE UNIT 22(step 22))
for i_1=1 to n_1 do
   (step 221)
   [a'_1]←D-Add([a_1], 1)
   [b'_1]←D-Add([b_1], f_2([a'_1]))
   [t'_1]←D-LE([y_1], [b'_1])
   (step 222)
   if AND(EQ([s_1], RUN), EQ([s_2], END)) then
     (step b-i)
     [a_1]←[a'_1]
     [b_1]←[b'_1]
     [t_1]←[t'_1]
     (step b-ii)
     [s_2]←PRE
  end if
   (step 223)
   if AND(EQ([s_1], RUN), EQ([t_1], 1)) then
     [s_1]←END
  end if
end for
(SECRET OUTPUT CALCULATION UNIT 23(step 23))
[z'_1]←[b_1]
if EQ([s_1], END) then
   [z_1]←[z'_1]
else
   [z_1]←NULL
end if
return[z_1]
```

Fig. 5

EXAMPLE OF PROCESSING OF SECURE ITERATIVE COMPUTATION UNIT 2 WITH RESPECT TO SECOND ITERATIVE CALCULATION

```
Notation:f_2([x_2])
Input:[x_2]
Output:[z_2]
(SECRET INPUT REFLECTION UNIT 21(step 21))
if AND(EQ([s_2],PRE),NE([x_2],NULL)) then
    (step a)
    [a_2]←0
    [t_2]←LE([x_2],[a_2])
    (step b)
    (step c)
    [s_2]←RUN
end if
  (SECRET UPDATE UNIT 22(step 22))
for i_1=1 to n_2 do
  (step 221)
  [a'_2]←D-Add([a_2],10)
  [t'_2]←D-LE([x_2],[a'_2])
  (step 222)
  if EQ([s_2],RUN) then
    (step b-i)
    [a_2]←[a'_2]
    [t_2]←[t'_2]
    (step b-ii)
  end if
  (step 223)
  if AND(EQ([s_2],RUN),EQ([t_2],1)) then
    [s_2]←END
  end if
end for
(SECRET OUTPUT CALCULATION UNIT 23(step 23))
[z'_2]←[a_2]
if EQ([s_2],END) then
  [z_2]←[z'_2]
else
  [z_2]←NULL
end if
return [z_2]
```

Fig. 6

MODIFICATION OF CALCULATION BY SECURE ITERATIVE COMPUTATION UNIT 2 WITH RESPECT TO FIRST ITERATIVE CALCULATION

```
Notation: f1([x1], [y1])
Input: [x1], [y1]
Output: [z1]
(SECRET INPUT REFLECTION UNIT 21(step 21))
[c1,1]←AND(EQ([s1], PRE), NE([x1], NULL), NE([y1], NULL))
(step a)
[a1]←IfElse([c1,1], [x1], [a1])
[b1]←IfElse([c1,1], [a1], [b1])
[t1]←IfElse([c1,1], LE([y1], [b1]), [t1])
 (step b)
[s2]←IfElse([c1,1], PRE, [s2])
 (step c)
[s1]←IfElse([c1,1], RUN, [s1])
(SECRET UPDATE UNIT 22(step 22))
for i1=1 to n1 do
    (step 221)
    [a'1]←D-Add([a1], 1)
    [b'1]←D-Add([b1], f2([a'1]))
    [t'1]←D-LE([y1], [b'1])
    (step 222)
    [c1,2]←AND(EQ([s1], RUN), EQ([s2], END))
    (step b-i)
    [a1]←IfElse([c1,2], [a'1], [a1])
    [b1]←IfElse([c1,2], [b'1], [b1])
    [t1]←IfElse([c1,2], [t'1], [t1])
    (step b-ii)
    [s2]←IfElse([c1,2], PRE, [s2])
    (step 223)
    [c1,3]←AND(EQ([s1], RUN), EQ([t1], 1))
    [s1]←IfElse([c1,3], END, [s1])
end for
(SECRET OUTPUT CALCULATION UNIT 23(step 23))
  [c1,4]←EQ([s1], END)
  [z'1]←[b1]
  [z1]←IfElse([c1,4], [z'1], NULL)
return[z1]
```

Fig. 7

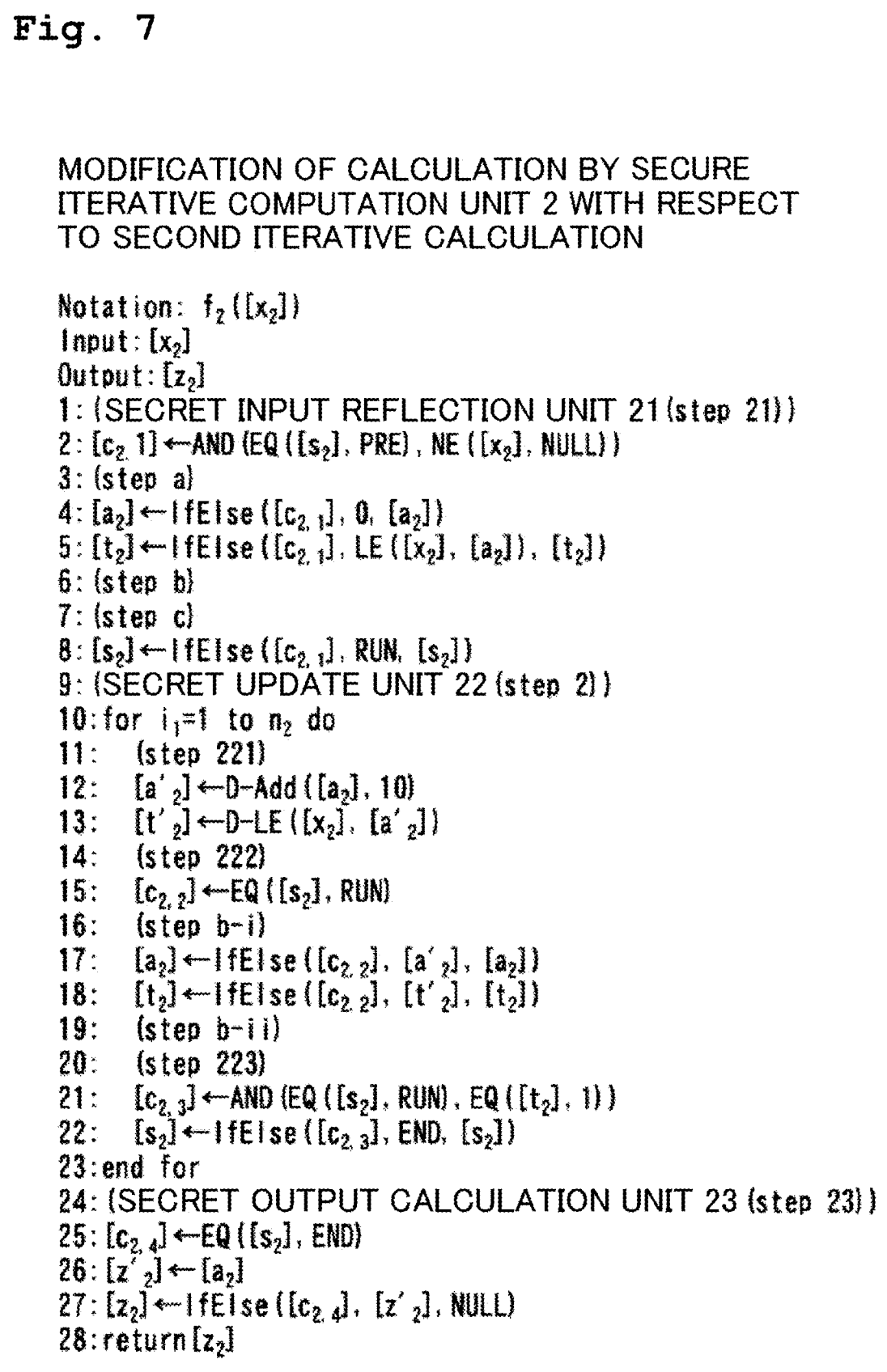

MODIFICATION OF CALCULATION BY SECURE ITERATIVE COMPUTATION UNIT 2 WITH RESPECT TO SECOND ITERATIVE CALCULATION

```
Notation: f_2([x_2])
Input: [x_2]
Output: [z_2]
(SECRET INPUT REFLECTION UNIT 21 (step 21))
[c_{2,1}] ← AND(EQ([s_2], PRE), NE([x_2], NULL))
(step a)
[a_2] ← IfElse([c_{2,1}], 0, [a_2])
[t_2] ← IfElse([c_{2,1}], LE([x_2], [a_2]), [t_2])
(step b)
(step c)
[s_2] ← IfElse([c_{2,1}], RUN, [s_2])
(SECRET UPDATE UNIT 22 (step 2))
for i_1=1 to n_2 do
    (step 221)
    [a'_2] ← D-Add([a_2], 10)
    [t'_2] ← D-LE([x_2], [a'_2])
    (step 222)
    [c_{2,2}] ← EQ([s_2], RUN)
    (step b-i)
    [a_2] ← IfElse([c_{2,2}], [a'_2], [a_2])
    [t_2] ← IfElse([c_{2,2}], [t'_2], [t_2])
    (step b-ii)
    (step 223)
    [c_{2,3}] ← AND(EQ([s_2], RUN), EQ([t_2], 1))
    [s_2] ← IfElse([c_{2,3}], END, [s_2])
end for
(SECRET OUTPUT CALCULATION UNIT 23 (step 23))
[c_{2,4}] ← EQ([s_2], END)
[z'_2] ← [a_2]
[z_2] ← IfElse([c_{2,4}], [z'_2], NULL)
return [z_2]
```

SECRET MULTIPLE REPETITION CALCULATION APPARATUS, METHOD AND PROGRAM

CROSS-REFERENCE TO RELATED APPLICATION

The present application is based on PCT filing PCT/JP2019/040006, filed Oct. 10, 2019, the entire contents of which are incorporated herein by reference.

TECHNICAL FIELD

The present invention relates to cryptographic technology. In particular, the present invention relates to a technique for performing an iterative calculation without revealing input and output values and the number of iterations required until end of calculation.

BACKGROUND ART

As a method of obtaining a specific calculation result without restoring an encrypted numerical value, there is a method called secure computation (for example, refer to NPL 1). In a method according to NPL 1, by performing encryption involving distributing pieces of a numerical value to three secure computation apparatuses and having the three secure computation apparatuses perform cooperative computing, results of addition and subtraction, constant addition, multiplication, constant multiplication, logical operations (negation, conjunction, disjunction, and exclusive disjunction), and data format conversion (integers and binary numbers) can be held while being distributed to the three secure computation apparatuses or, in other words, while being encrypted.

When performing an iterative calculation of which the number of iterations until the end of the calculation is indeterminate without revealing the number of iterations in addition to not revealing values of input and output, there is a method of obtaining a number N that constitutes an upper bound of the number of iterations until an end of calculation in advance and performing N-number of iterative calculations without updating a value of a calculation result when a condition of the end of the calculation is satisfied midway through the calculation.

CITATION LIST

Non Patent Literature

[NPL 1] Koji Chida, Koki Hamada, Dai Ikarashi, Katsumi Takahashi, “A Three-Party Secure Function Evaluation with Lightweight Verifiability Revisited”, In CSS, 2010.

SUMMARY OF THE INVENTION

Technical Problem

However, when an iterative calculation is further included in an iterative calculation, if an upper bound of the number of iterations until an end of calculation of the outside iterative calculation is represented by N and an upper bound of the number of iterations until an end of calculation of the inside iterative calculation is represented by M, then the inside iterative calculation must be executed MN-number of times.

An object of the present invention is to provide a secure multi-iterative computation apparatus, method, and program that realizes, when an iterative calculation is further included in an iterative calculation, the iterative calculations with a fewer number of executions of the inside iterative calculation.

Means for Solving the Problem

A secure multi-iterative computation apparatus according to an aspect of the present invention includes: a secret initialization unit which sets a loop variable that is a predetermined variable to be used in iterative calculations and of which a value may change for each iterative calculation as a dummy value and which sets a state of each iterative calculation to “pre-execution”; and a secure iterative computation unit which outputs a result of performing an iterative calculation that is an object of calculation using an input and the predetermined number of iterations, wherein the secure iterative computation unit includes: (i) a secret input reflection unit which, when a state of an object iterative calculation that is an iterative calculation presently being an object of calculation is “pre-execution” and all inputs of the object iterative calculation are not dummy values, performs a secure computation of an initial value of the loop variable of the object iterative calculation using an input of the object iterative calculation, when the object iterative calculation includes an inside iterative calculation, initializes a state of each inside iterative calculation to “pre-execution”, and changes the state of the object iterative calculation to “execution running”; (ii) a secret update unit including: (a) a secret loop variable calculation unit which performs a secure computation of a new value of the loop variable of the object iterative calculation using a value of the loop variable of the object iterative calculation obtained by an immediately prior secure computation and, when the object iterative calculation includes an inside iterative calculation, by performing processing of the secure iterative computation unit with respect to each inside iterative calculation; (b) a secret loop variable update unit which adopts the new value as the value of the loop variable of the object iterative calculation when the state of the object iterative calculation is “execution running” and the state of each iterative calculation inside the object iterative calculation is “end” and which updates the state of each iterative calculation inside the object iterative calculation to “pre-execution”; and (c) a secret end state reflection unit which changes the state of the object iterative calculation to “end” when the state of the object iterative calculation is “execution running” and the value of the loop variable of the object iterative calculation satisfies a predetermined end condition, the secret update unit performing processing for the predetermined number of iterations; and (iii) a secret output calculation unit which performs a secure computation of an output value of the object iterative calculation from the value of the loop variable and outputs the output value when the state of the object iterative calculation is “end”.

Effects of the Invention

When an iterative calculation is further included in an iterative calculation, the iterative calculations can be realized with a fewer number of executions of the inside iterative calculation.

BRIEF DESCRIPTION OF DRAWINGS

FIG. 3 is a diagram showing an example of processing of a secret initialization unit 1.

FIG. 4 is a diagram showing an example of processing of a secure iterative computation unit 2 with respect to a first iterative calculation.

FIG. 5 is a diagram showing an example of processing of the secure iterative computation unit 2 with respect to a second iterative calculation.

FIG. 6 is a diagram showing a modification example of the secure iterative computation unit 2 with respect to the first iterative computation.

FIG. 7 is a diagram showing a modification example of the secure iterative computation unit 2 with respect to the second iterative calculation.

DESCRIPTION OF EMBODIMENTS

[Outline]

Figure 1:
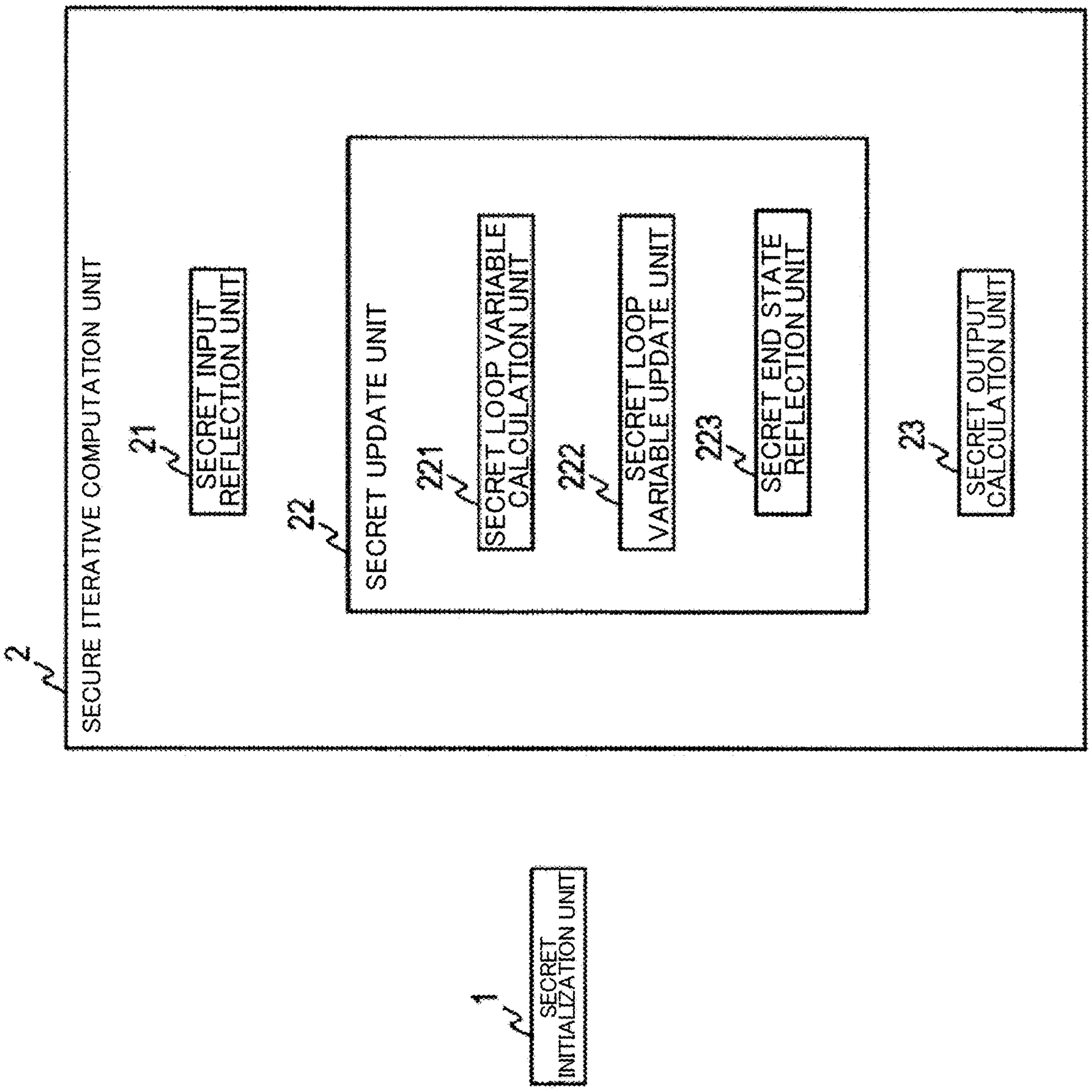
FIG. 1 is a diagram showing an example of a functional configuration of a secure multi-iterative computation apparatus.

In the present invention, when an inside iterative calculation does not end after a predetermined number of iterations, a midway value of a loop variable is retained and a calculation of an output value is not performed in an outside iterative calculation. In addition, subsequently, execution of the inside iterative calculation is continued using the value of the loop variable having been retained when the inside iterative calculation is executed once again. In other words, in each outside iterative calculation, an object iterative calculation that is an iterative calculation presently being an object of calculation is only performed when all iterative calculations immediately inside the object iterative calculation have ended. Recursively performing these processing steps enables wasteful calculation in inside iterative calculations to be reduced.

EMBODIMENT

An embodiment of the present invention will be described in detail below. It should be noted that a constituent unit having a same function in the drawings will be denoted by a same numeral and a redundant description will be omitted.

As shown in FIG. 1, a secure multi-iterative computation apparatus is provided with a secret initialization unit 1 and a secure iterative computation unit 2. The secure iterative computation unit 2 is provided with a secret input reflection unit 21, a secret update unit 22, and a secret output calculation unit 23. The secret update unit 22 is provided with a secret loop variable calculation unit 221, a secret loop variable update unit 222, and a secret end state reflection unit 223.

Figure 2:
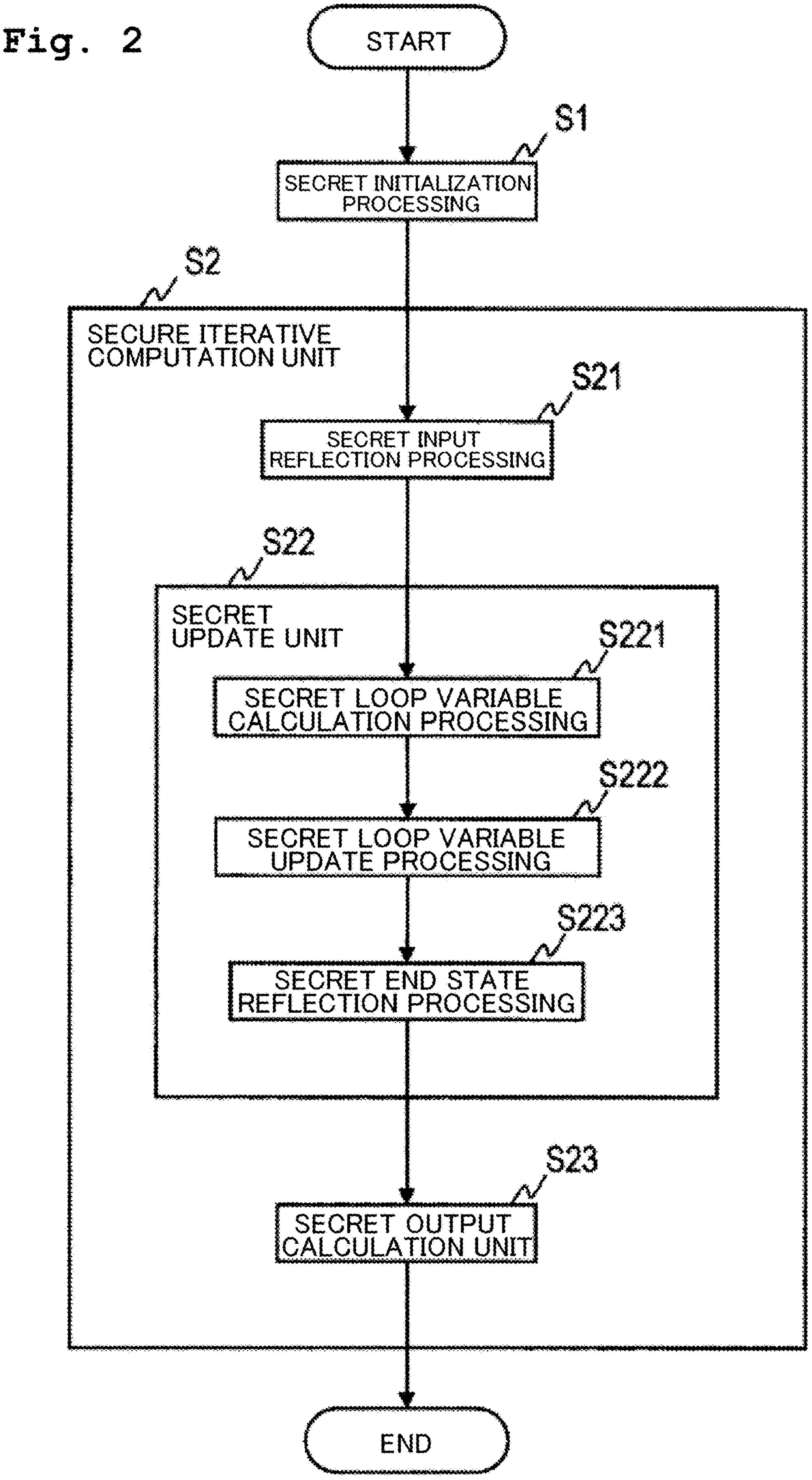
FIG. 2 is a diagram showing an example of processing procedures of a secure multi-iterative computation method.

For example, a secure multi-iterative computation method is realized as the respective constituent units of the secure multi-iterative computation apparatus perform processing of step S1 to step S2 shown in FIG. 2. The steps will now be described.

Hereinafter, each constituent unit of the secure multi-iterative computation apparatus will be described.

<Secret Initialization Unit 1>

The secret initialization unit 1 sets a loop variable that is a predetermined variable to be used in iterative calculations and of which a value may change for each iterative calculation as a dummy value and sets a state of each iterative calculation to "pre-execution" (step S1). The dummy value refers to a predetermined value indicating that the value of the loop variable is a dummy.

<Secure Iterative Computation Unit 2>

The secure iterative computation unit 2 outputs a result of performing an iterative calculation that is an object of calculation using an input and the predetermined number of iterations (step S2).

The secure iterative computation unit 2 is provided with the secret input reflection unit 21, the secret update unit 22, and the secret output calculation unit 23. For example, processing of step S2 is realized when the secret input reflection unit 21, the secret update unit 22, and the secret output calculation unit 23 perform processing of step S21 to step S23.

<<Secret Input Reflection Unit 21>>

The secret input reflection unit 21 performs, when a state of an object iterative calculation that is an iterative calculation presently being an object of calculation is "pre-execution" and all inputs of the object iterative calculation are not dummy values, (a) a secure computation of an initial value of the loop variable of the object iterative calculation using an input of the object iterative calculation, (b) when the object iterative calculation includes an inside iterative calculation, initializes a state of each inside iterative calculation to "pre-execution", and (c) changes the state of the object iterative calculation to "execution running" (step S21).

<<Secret Update Unit 22>>

The secret update unit 22 is provided with the secret loop variable calculation unit 221, the secret loop variable update unit 222, and the secret end state reflection unit 223.

For example, processing of the secret update unit 22 is realized when the secret loop variable calculation unit 221, the secret loop variable update unit 222, and the secret end state reflection unit 223 perform processing of step S221 to step S223. The secret update unit 22 performs processing of step S221 to step S223 by the secret loop variable calculation unit 221, the secret loop variable update unit 222, and the secret end state reflection unit 223 for a predetermined number of iterations.

<<<Secret Loop Variable Calculation Unit 221>>>

The secret loop variable calculation unit 221 performs a secure computation of a new value of the loop variable of the object iterative calculation using a value of the loop variable of the object iterative calculation obtained by an immediately prior secure computation and, when the object iterative calculation includes an inside iterative calculation, by performing processing of the secure iterative computation unit 2 with respect to each inside iterative calculation (step S221).

<<<Secret Loop Variable Update Unit 222>>>

The secret loop variable update unit 222 (b-i) adopts the new value obtained by a secure computation by the secret loop variable calculation unit 221 as the value of the loop variable of the object iterative calculation when the state of the object iterative calculation is "execution running" and the state of each iterative calculation inside the object iterative calculation is "end" and (b-ii) updates the state of each iterative calculation inside the object iterative calculation to "pre-execution" (step S222).

<<<Secret End State Reflection Unit 223>>>

The secret end state reflection unit 223 changes the state of the object iterative calculation to "end" when the state of the object iterative calculation is "execution running" and the value of the loop variable of the object iterative calculation satisfies a predetermined end condition (step S223).

<<Secret Output Calculation Unit 23>>

The secret output calculation unit 23 performs a secure computation of an output value of the object iterative calculation from the value of the loop variable and outputs the output value when the state of the object iterative calculation is "end" (step S23). The secret output calculation unit 23 outputs a dummy value when the state of the object iterative calculation is not "end".

With conventional art, in order to reliably end an inside iterative calculation every time, a large upper bound is required to be set even when a large number of iterations are only sporadically necessary. In the present embodiment, when an inside iterative calculation does not end, execution of other processing steps is merely "simulated" and a value is not actually updated, and execution of the processing steps is continued once the inside iterative calculation is subsequently restarted. Accordingly, wasteful iterations can be reduced when the number of inside iterations varies under a large upper bound.

More specifically, when the state of the object iterative calculation is "execution running" and the state of each iterative calculation inside the object iterative calculation is not "end" or, in other words, when the value of the loop variable of the object iterative calculation does not satisfy a predetermined end condition, the processing of the secret input reflection unit 21 that performs processing such as performing a secure computation of an initial value of the loop variable of the object iterative calculation is not performed. This is because the secret input reflection unit 21 performs processing when at least the state of the object iterative calculation is "pre-execution". In addition, in this case, the processing of the secret output calculation unit 23 that performs a secure computation of an output value of the object iterative calculation from the value of the loop variable and outputs the output value is not performed. This is because processing of the secret output calculation unit 23 is performed when the state of the object iterative calculation is "end".

Therefore, in this case, the processing of the secret output calculation unit 23 is not performed and the secret update unit 22 continues the iterative calculation using the value of the loop variable of the object iterative calculation obtained by an immediately prior secure computation. In other words, in this case, the value of the loop variable of the object iterative calculation is retained and a secure computation and output of an output value of the object iterative calculation are not performed from the value of the loop variable.

As described above, when an inside iterative calculation does not end after a predetermined number of iterations, a midway value of a loop variable is retained and a calculation of an output value is not performed in an outside iterative calculation. In addition, subsequently, execution of the iterative calculation is continued using the value of the loop variable having been retained when the inside iterative calculation is executed once again. In other words, in each iterative calculation, an object iterative calculation is only performed when all iterative calculations immediately inside the object iterative calculation have ended. Recursively performing these processing steps enables wasteful calculation in inside iterative calculations to be reduced.

When desiring to execute multiple iterative calculations without revealing the number of iterations, the number of inside iterations to be executed can be reduced by slightly increasing the number of outside iterations to be executed. While the number of inside iterations to be executed according to ordinary methods is obtained as a product of upper bounds of the numbers of iterations of respective tiers and becomes extremely large as a consequence, the present invention is capable of significantly reducing the number of inside iterations to be executed.

For example, when it is known that an upper bound of the number of outside iterations is 6, an upper bound of the number of inside iterations is 50, and the number of inside iterations only exceeds 25 twice, with a conventional method, the inside iterative calculation must be executed $300=50\times 6$ times. However, according to the present invention, for example, by setting the upper bound of the number of outside iterations to 8 and the upper bound of the number of inside iterations to 25, the number of inside iterations can be limited to $200=25\times 8$ executions.

Let a time excluding a processing time of an iterative calculation inside an iterative calculation x among a processing time required by one iteration of x when the present embodiment is not used be represented by f(x), an upper bound of the number of iterations be represented by N(x), and a product of upper bounds of the numbers of iterations of respective iterative calculations including x be represented by T(x) (where T(x)=1 when x represents an outermost iterative calculation), and let a time excluding a processing time of an iterative calculation inside an iterative calculation x among a processing time required by one iteration of x when the present embodiment is used be represented by f' (x), an upper bound of the number of iterations be represented by N' (x) and a product of upper bounds of the numbers of iterations of respective iterative calculations including x be represented by I' (x) (where I' (x)=1 when x represents an outermost iterative calculation). In this case, when the upper bound N' (x) of the number of iterations of each iterative calculation x can be set so as to satisfy $\Sigma x\ (T(x)N(x)f(x))>\Sigma x\ (T'(x)N'(x)f'(x))$, a total processing time can be reduced by the present embodiment.

[Example of Iterative Calculation]

FIG. 3 and FIG. 4 show an example of processing by the secure multi-iterative computation apparatus when the secure multi-iterative computation apparatus performs iterative calculations constituted by a first iterative calculation and a second iterative calculation.

The first iterative calculation will be described as $f_1(x_1, y_1)$. $f_1(x_1, y_1)$ is also a function that outputs a minimum $u(n)=\Sigma_{i=0}^{n-1} f_2\ (x_1+i)$ that satisfies $y_1\leq u(n)$ and $1\leq n$. Let us assume that an input of $f_1(x_1, y_1)$ is $x_1$, $y_1$ and an output of $f_1(x_1, y_1)$ is $z_1$. Let a loop variable of $f_1(x_1, y_1)$ be represented by $a_1$, $b_1$, $t_1$. In addition, let a variable representing a state of the first iterative calculation be represented by $s_1$. Hereinafter, the variable $s_1$ representing the state of the first iterative calculation may simply be referred to as a state $s_1$ of the first iterative calculation. Let us assume that the predetermined number of iterations of the first iterative calculation is $n_1$, where $n_1$ is a predetermined positive integer.

In addition, the second iterative calculation will be described as $f_2(x_2)$. $f_2(x_2)$ is also a function that outputs a minimum multiple of 10 that is equal to or larger than $x_2$. Let us assume that an input of $f_2(x)$ is $x_2$ and an output of $f_2(x_2)$ is $z_2$. Let a loop variable of $f\ (x_2)$ be represented by $a_2$, $t_2$. In addition, let a variable representing a state of the second iterative calculation be represented by $s_2$. Hereinafter, the variable $\mathbf{5}_2$ representing the state of the second iterative calculation may simply be referred to as a state $s_2$ of the second iterative calculation. Let us assume that the predetermined number of iterations of the second iterative calculation is $n_2$, where $n_2$ is a predetermined positive integer.

Hereinafter, a notation used in FIG. 3 and FIG. 4 will be described.

[x] represents a secure value of x.

[z]←[a]+[b] means calculating a secure value of z such that z=a+b.

[z]←[a] [b] means calculating a secure value of z such that z=ab.

[z]←EQ([a], [b]) means calculating a secure value of z such that z=1 when a=b and z=0 when not a=b.

[z]←LE([a], [b]) means calculating a secure value of z such that z=1 when a≤b and z=0 when not a≤b.

[z]←NE([a], [b]) means calculating a secure value of z such that z=1 when a≠b and z=0 when not a≠b.

[z]←IfElse([c], [a], [b]) means calculating a secure value of z such that z=a when c=1 and z=b when C=0.

[z]←AND([$a_1$], [$a_2$], . . . , [$a_n$]) means calculating a secure value of z such that z=$a_1a_2$ . . . $a_n$.

NULL represents a predetermined dummy value. Let us assume that whether or not a given variable v is a dummy can be determined based on whether or not v=NULL. Let us assume that processing for making v a dummy can be realized by v←NULL and that processing for making v a value v that is not a dummy can be realized by v←x. Alternatively, a different variable Dummy(v) may be prepared for each variable v, in which case Dummy(v)=1 when the variable v is a dummy and Dummy(v)=0 when the variable vis nota dummy. In this case, processing for making v a dummy can be realized by Dummy (v)←1 and processing for making v a value v that is not a dummy can be realized by Dummy(v)←0.

Let us assume that PRE, RUN, and END respectively represent "pre-execution", "execution running", and "end".

In the secret loop variable calculation unit 221, each processing step is calculated such that when a dummy is included as a part of an input, an output is also a dummy. Such a calculation will be referred to as a dummy-accommodating calculation. Respective dummy-accommodating calculations will be described as follows.

[z]←D-Add([a], [b]) means performing a dummy-accommodating calculation for obtaining a secure value of z such that z=a+b.

[z]←D-LE([a], [b]) means performing a dummy-accommodating calculation for obtaining a secure value of z such that z=1 when a≤b and z=0 when not a≤b.

It should be noted that secure iterative computation are dummy-accommodating.

In the case of this example, processing of the secret initialization unit 1 corresponds to "1:" to "7:" in FIG. 3.

Processing of the secure iterative computation unit 2 corresponds to "1:" to "39:" in FIG. 4.

Processing of the secret input reflection unit 21 corresponds to "1:" to "11:" in FIG. 4.

Processing of the secret update unit 22 corresponds to "12:" to "31:" in FIG. 4.

Processing of the secret loop variable calculation unit 221 corresponds to "12:" to "17:" in FIG. 4. In "16:" in FIG. 4, processing of the secure iterative computation unit 2 with respect to the second iterative calculation inside the first iterative calculation or, in other words, calculation processing of $f_2$([$a_1$']) is performed. Processing of the secure iterative computation unit 2 with respect to the second iterative calculation corresponds to "1:" to "34:" in FIG. 5.

Processing of the secret loop variable update unit 222 corresponds to "18:" to "26:" in FIG. 4.

Processing of the secret end state reflection unit 223 corresponds to "27:" to "31:" in FIG. 4.

Processing of the secret output calculation unit 23 corresponds to "32:" to "39:" in FIG. 4.

[Modification]

While an embodiment of the present invention has been described above, specific configurations are not limited to the embodiment and it is needless to say that the present invention also includes appropriate modifications in design or the like having been made without departing from the spirit and the scope of the invention.

The various processing steps explained in the embodiment may not only be executed in chronological order according to the described sequences but may also be executed in parallel or on an individual basis in accordance with processing capabilities of an apparatus to be used to execute the processing steps or as may be necessary.

For example, exchange of data between constituent units of the secure multi-iterative computation apparatus may be performed either directly or via a storage unit (not illustrated).

In addition, when performing conditional processing, processing of both a case where a condition is satisfied so as not to reveal a value that constitutes a condition (a secure value) and a case where the condition is not satisfied may be executed by changing a write destination to a temporary variable.

For example, with respect to a secure value [$a_i$] of each value $a_i$ that is changed in at least one of the cases, when a secure value of a value when the condition is satisfied is represented by [$t_i$], a secure value of a value when the condition is not satisfied is represented by [$f_i$], and a secure value of a bit representing that the condition is satisfied (1) or not satisfied (0) is represented by [c], a calculation of [$a_i$]←[c] x [$t_i$]+(1−[c])×[$f_i$] may be performed.

In other words, the secret input reflection unit 21, the secret loop variable update unit 222, the secret end state reflection unit 223, and the secret output calculation unit 23 may perform processing while securing whether or not a present case corresponds to each case.

An example of processing performed by the secret input reflection unit 21, the secret loop variable update unit 222, the secret end state reflection unit 223, and the secret output calculation unit 23 while securing whether or not a present case corresponds to each case is shown in FIG. 6 and FIG. 7. Symbols and notation that appear in FIG. 6 and FIG. 7 are similar to those described in [Example of iterative calculation].

Processing of the secret input reflection unit 21 corresponds to "1:" to "10:" in FIG. 6.

Processing of the secret update unit 22 corresponds to "11:" to "33:" in FIG. 6.

Processing of the secret loop variable calculation unit 221 corresponds to "13:" to "16:" in FIG. 6. In "15:" in FIG. 6, processing of the secure iterative computation unit 2 with respect to the second iterative calculation inside the first iterative calculation or, in other words, calculation processing of $f_2$([$a_1$']) is performed. Processing of the secure iterative computation unit 2 with respect to the second iterative calculation in this case corresponds to "1:" to "28:" in FIG. 7.

Processing of the secret loop variable update unit 222 corresponds to "17:" to "24:" in FIG. 6.

Processing of the secret end state reflection unit 223 corresponds to "26:" to "27:" in FIG. 6.

Processing of the secret output calculation unit 23 corresponds to "29:" to "33:" in FIG. 6.

[Program and Recording Medium]

Figure 8:
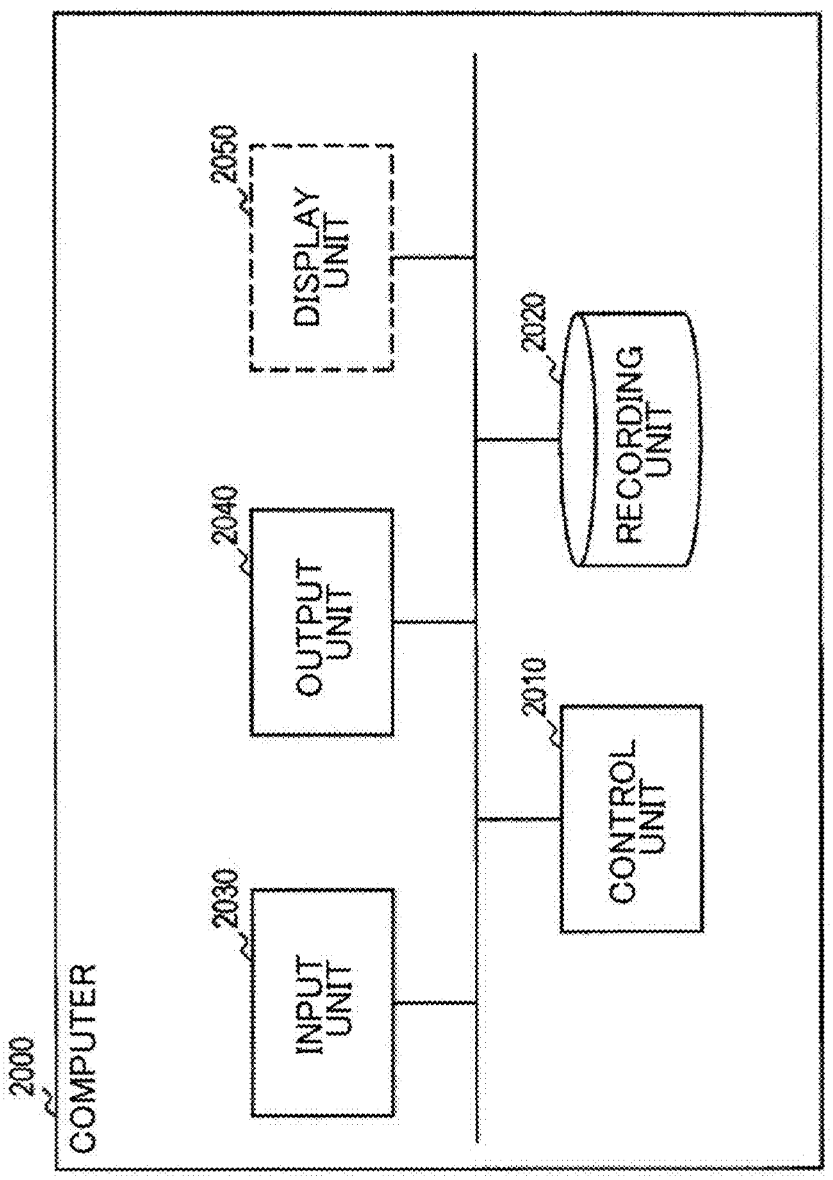
FIG. 8 is a diagram showing an example of a functional configuration of a computer.

When realizing the various processing functions in the various apparatuses described above with a computer, processing contents of functions which each apparatus must be equipped with are described by a program. In addition, the various processing functions in the various apparatuses described above are realized on the computer by having the computer execute the program. For example, the various processing steps described above can be performed by having a recording unit 2020 of a computer shown in FIG. 8 read a program to be executed and cause a control unit 2010, an input unit 2030, an output unit 2040, a display unit 2050, and the like to perform operations.

The program describing the processing contents can be recorded in a computer-readable recording medium. Any computer-readable recording medium may be used such as a magnetic recording apparatus, an optical disk, a magneto-optical recording medium, and a semiconductor memory.

In addition, the program is distributed by, for example, selling, transferring, or lending a portable recording medium such as a DVD or a CD-ROM on which the program is recorded. Furthermore, a configuration may be adopted in which the program is stored in a storage apparatus of a server computer and the server computer transmits the program to other computers via network in order to distribute the program.

For example, a computer that executes such a program first temporarily stores the program recorded in a portable recording medium or the program transmitted from a server computer in its own storage apparatus. In addition, when executing processing, the computer reads the program stored in its own storage apparatus and executes processing in accordance with the read program. Furthermore, as an alternative execution mode of the program, a computer may read a program directly from a portable recording medium and execute processing in accordance with the program or, every time the program is transmitted from a server computer to the computer, the computer may sequentially execute processing in accordance with the received program. In addition, a configuration may be adopted in which a program is not transmitted to the computer from a server computer but the processing described above is executed by a so-called ASP (Application Service Provider) type service which realizes a processing function only by issuing an execution instruction and acquiring a result thereof. It should be noted that the program according to the present mode includes information which is to be processed by an electronic computer and which is equivalent to a program (data or the like which is not a direct command intended for a computer but which has a property of specifying processing by the computer).

In addition, in the mode, while the present apparatus is configured by having a computer execute a prescribed program, at least a part of processing contents thereof may be realized by hardware.

The invention claimed is:

1. A secure multi-iterative computation apparatus, comprising:

processing circuitry configured to set a loop variable that is a predetermined variable to be used in iterative calculations and of which a value may change for each iterative calculation as a dummy value and which sets a state of each iterative calculation to "pre-execution"; and output a result of performing an iterative calculation that is an object of calculation using an input and a predetermined number of iterations, wherein the processing circuitry configured to:

(i) when a state of an object iterative calculation that is an iterative calculation presently being an object of calculation is "pre-execution" and all inputs of the object iterative calculation are not dummy values, perform a secure computation of an initial value of the loop variable of the object iterative calculation using an input of the object iterative calculation, when the object iterative calculation includes an inside iterative calculation, initialize a state of each inside iterative calculation to "pre-execution", and change the state of the object iterative calculation to "execution running";

(ii) (a) perform a secure computation of a new value of the loop variable of the object iterative calculation using a value of the loop variable of the object iterative calculation obtained by an immediately prior secure computation and, when the object iterative calculation includes the inside iterative calculation, by performing processing of the processing circuitry with respect to each inside iterative calculation;

(b) adopt the new value as the value of the loop variable of the object iterative calculation when the state of the object iterative calculation is "execution running" and the state of each iterative calculation inside the object iterative calculation is "end" and update the state of each iterative calculation inside the object iterative calculation to "pre-execution"; and (c) change the state of the inside iterative calculation to "end" when the state of the inside iterative calculation is "execution running" and the value of the loop variable of the inside iterative calculation satisfies a predetermined end condition before reaching the predetermined number of iterations, the processing circuitry performing processing of the object iterative calculation for the predetermined number of iterations; and (iii) perform a secure computation of an output value of the object iterative calculation from the value of the loop variable and output the output value when the state of the object iterative calculation is "end".

2. The secure multi-iterative computation apparatus according to claim 1, wherein the processing circuitry performs processing while securing whether or not a present case corresponds to the respective conditions under which the processing circuitry performs the processing according to (i) to (iii).

3. A non-transitory computer readable medium that stores a program for causing a computer to function as the processing circuitry of the secure multi-iterative computation apparatus according to claim 1.

* * * * *